(12) United States Patent
Griffin et al.

(10) Patent No.: US 11,868,802 B2
(45) Date of Patent: Jan. 9, 2024

(54) APPLICATION LIFECYCLE MANAGEMENT BASED ON REAL-TIME RESOURCE USAGE

(71) Applicant: Red Hat, Inc., Raleigh, NC (US)

(72) Inventors: Leigh Griffin, Waterford (IE); Pierre-Yves Chibon, Paris la Défense (FR)

(73) Assignee: Red Hat, Inc., Raleigh, NC (US)

( * ) Notice: Subject to any disclaimer, the term of this patent is extended or adjusted under 35 U.S.C. 154(b) by 361 days.

(21) Appl. No.: 17/371,651

(22) Filed: Jul. 9, 2021

(65) Prior Publication Data

US 2023/0010567 A1   Jan. 12, 2023

(51) Int. Cl.
G06F 9/48 (2006.01)
G06F 9/445 (2018.01)

(52) U.S. Cl.
CPC ........ G06F 9/4856 (2013.01); G06F 9/44505 (2013.01); G06F 9/44594 (2013.01)

(58) Field of Classification Search
CPC .................................................. G06F 9/4856
See application file for complete search history.

(56) References Cited

U.S. PATENT DOCUMENTS

| 8,402,463 | B2 * | 3/2013 | Norton | G06F 11/348 |
| | | | | 712/216 |
| 9,722,945 | B2 | 8/2017 | Siciliano et al. | |
| 2016/0191617 | A1 | 6/2016 | Hintermeister et al. | |
| 2021/0064433 | A1 | 3/2021 | Nakfour | |
| 2021/0096913 | A1 | 4/2021 | Nadeau et al. | |
| 2021/0103499 | A1 | 4/2021 | Alluboyina et al. | |
| 2021/0109732 | A1 | 4/2021 | Mitra | |
| 2021/0109789 | A1 | 4/2021 | McWeeney | |

FOREIGN PATENT DOCUMENTS

| CN | 111427668 A | 7/2020 |
| CN | 112214303 A | 1/2021 |
| CN | 112306634 A | 2/2021 |
| CN | 112527349 A | 3/2021 |

OTHER PUBLICATIONS

Author Unknown, "Autoscale a load-balanced web application," Oracle, Dec. 4, 2020, 5 pages.
Author Unknown, "Aws Auto Scaling," Amazon, available as early as Jul. 7, 2021, https://aws.amazon.com/autoscaling/, 7 pages.
(Continued)

*Primary Examiner* — Charlie Sun
(74) *Attorney, Agent, or Firm* — Dority & Manning, P.A.

(57) ABSTRACT

Application lifecycle management based on real-time resource usage. A first plurality of resource values that quantify real-time computing resources used by a first instance of an application is determined at a first point in time. Based on the first plurality of resource values, one or more utilization values are stored in a profile that corresponds to the application. Subsequent to storing the one or more utilization values in the profile, it is determined that a second instance of the application is to be initiated. The profile is accessed, and the second instance of the application is caused to be initiated on a first computing device utilizing the one or more utilization values identified in the profile.

20 Claims, 11 Drawing Sheets

(56) References Cited

OTHER PUBLICATIONS

Hillier, A., "Cloud Autoscaling Explained," Densify, available as early as Apr. 1, 2021, https://www.densify.com/articles/autoscaling, 6 pages.
Campbell, P., "Strategic Monitoring for Hybrid Cloud Infrastructure Provisioning," CloudBolt Software, Inc., accessed Apr. 9, 2021 from https://www.cloudbolt.io/blog/strategic-monitoring-for-hybrid-cloud-infrastructure-provisioning/, 4 pages.
Sivakumar, S., "New full stack monitoring capabilities in Azure Monitor," Azure Monitoring & Diagnostics, Sep. 24, 2018, https://azure.microsoft.com/en-us/blog/new-full-stack-monitoring-capabilities-in-azure-monitor, 8 pages.

* cited by examiner

APPLICATION LIFECYCLE MANAGEMENT BASED ON REAL-TIME RESOURCE USAGE

BACKGROUND

Applications executing in a computing system may have different resource utilization requirements at different times of the day or due to various factors that may be relatively arbitrary or unexpected.

SUMMARY

The examples maintain real-time computing resource utilization data of an instance of an application, which may be useful for selecting a suitable computing environment for additional instances of the application, scaling the instances of the application, monitoring the on-going execution of the instance, migrating of the instance from one computing device to another, and the like. The examples ensure that computing devices, such as in a cloud computing environment or the like, are utilized efficiently while providing the computing resources needed to multiple different instances of applications executing on the computing devices.

In one example a method is provided. The method includes determining at a first point in time, by a computing device comprising a processor device, a first plurality of resource values that quantify real-time computing resources used by a first instance of an application. The method further includes, based on the first plurality of resource values, storing one or more utilization values in a profile that corresponds to the application. The method further includes, subsequent to storing the one or more utilization values in the profile, determining that a second instance of the application is to be initiated. The method further includes accessing the profile and causing the second instance of the application to be initiated on a first computing device utilizing the one or more utilization values identified in the profile.

In another example a computer system is provided. The computer system includes one or more processor devices of one or more computing devices. The one or more processor devices are to determine at a first point in time a first plurality of resource values that quantify real-time computing resources used by a first instance of an application. The one or more processor devices are further to, based on the first plurality of resource values, store one or more utilization values in a profile that corresponds to the application. The one or more processor devices are further to, subsequent to storing the one or more utilization values in the profile, determine that a second instance of the application is to be initiated. The one or more processor devices are further to access the profile and cause the second instance of the application to be initiated on a first computing device utilizing the one or more utilization values identified in the profile.

In another example a non-transitory computer-readable storage medium is provided. The non-transitory computer-readable storage medium includes executable instructions to cause one or more processor devices to determine at a first point in time a first plurality of resource values that quantify real-time computing resources used by a first instance of an application. The instructions further cause the one or more processor devices to, based on the first plurality of resource values, store one or more utilization values in a profile that corresponds to the application. The instructions further cause the one or more processor devices to, subsequent to storing the one or more utilization values in the profile, determine that a second instance of the application is to be initiated. The instructions further cause the one or more processor devices to access the profile and cause the second instance of the application to be initiated on a first computing device utilizing the one or more utilization values identified in the profile.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
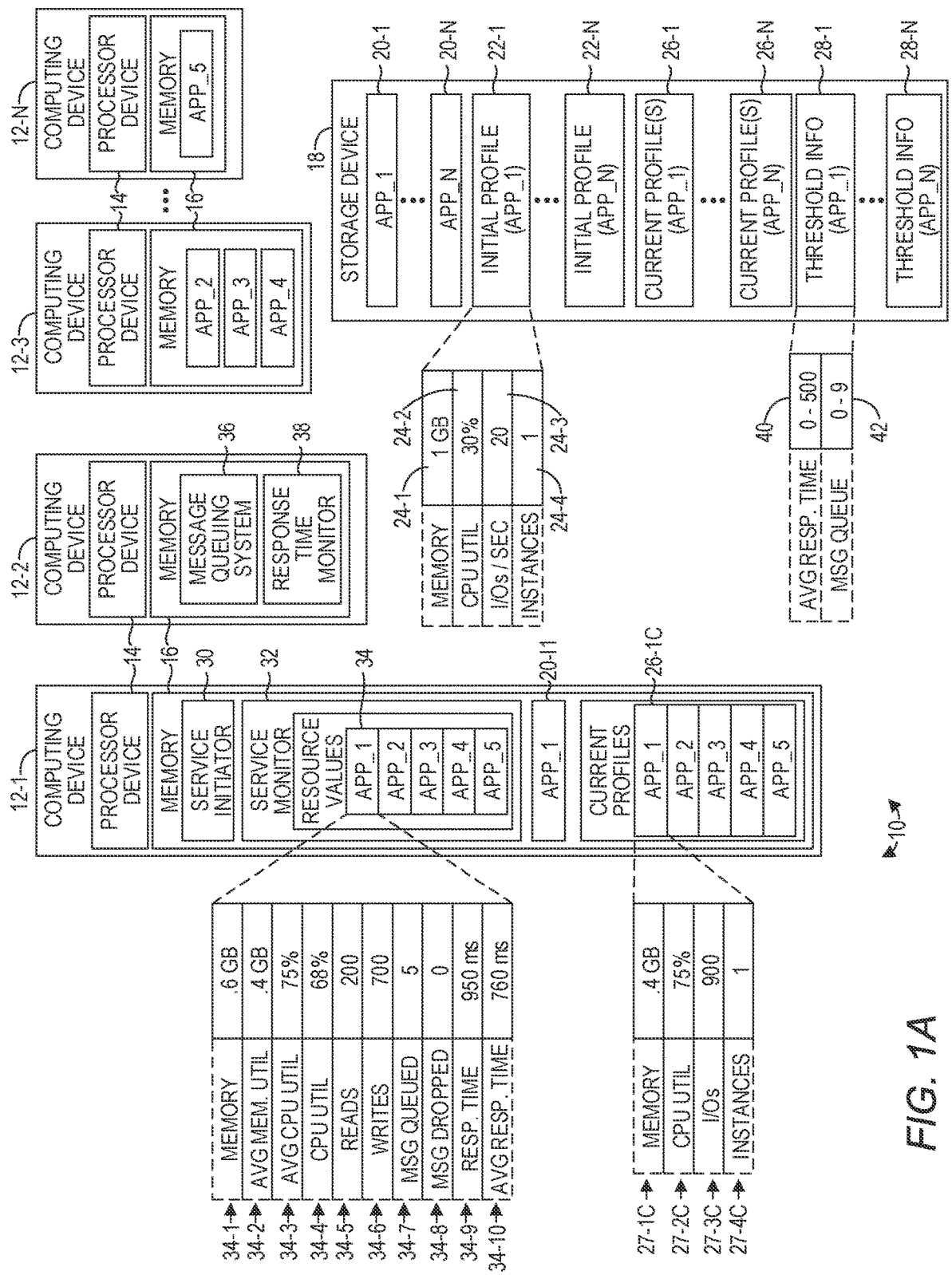
FIGS. 1A-1B are block diagrams of an environment at different points in time in which application lifecycle management based on real-time resource usage can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

An application executing on a computing system (referred to herein as an application instance, or an instance of an application) may have different resource utilization requirements at different times of the day or due to various factors that may be relatively arbitrary or unexpected. Often an application instance executes on a computing device with one or more other instances of that same application or other applications. In certain environments, such as a cloud computing environment, it may be possible to choose a particular computing device from a plurality of different computing devices on which an application instance should be initiated.

A developer of an application may expect that an application instance of the application will utilize a certain quantity or amount of computing resources, such as a particular amount of processor device resources, a particular amount of random access memory (RAM) resources, a particular amount of storage resources and the like, and may be able to quantify such expectations in a configuration file, or profile. This profile may be used to select a particular computing device to initiate an instance of the application. For example, if a profile indicates that an application instance is expected to utilize 25 gigabytes (GB) of memory, a computing device that has 25 GB of available memory may be selected to host the application instance.

However, the actual resource utilization of an application instance may be quite different from what the developer expected, and/or may vary considerably depending on usage, the time of day, or other factors. Thus, the expected resources identified in a profile may differ substantially from the actual resources utilized by an application instance. Where the actual resources utilized are substantially greater than the expected resources, this may lead to a number of problems, such as poor response times and can also negatively impact other applications executing on the same computing device. Where the actual resources utilized are substantially less than the expected resources, this may lead to a computing device being severely underutilized and, in some environments, to increased resource utilization charges.

The examples disclosed herein implement application lifecycle management based on real-time resource usage. The examples iteratively obtain resource values that quantify real-time computing resources used by an instance of an application. The resource values may include, for example, an amount of RAM used by the instance of the application, an amount of processor capacity used by the instance of the application, a message queue depth of the instance of the application, and the like. Based on the resource values, utilization values are updated in a profile. Subsequent initiations of instances of the application may be based on the utilization values in the profile. For example, a computing device may be selected that has sufficient RAM and/or processor resources available based on the utilization values in the profile. In some examples, constraints may be imposed on the application based on the utilization values, such as a maximum amount of RAM or a maximum amount of processor utilization.

The examples maintain real-time computing resource utilization data of an instance of an application, which may be useful for selecting a suitable computing environment for additional instances of the application, scaling the instances of the application, monitoring the on-going execution of the instance, migration of the instance from one computing device to another, and the like. The examples ensure that computing devices, such as in a cloud computing environment or the like, are utilized efficiently while providing the computing resources needed to multiple different applications executing on the computing devices.

FIG. 1A is a block diagram of an environment 10 according to one implementation. The environment 10 is a cloud computing environment in which instances of applications may be initiated on any of a plurality of different computing devices 12-1-12-N (generally, computing devices 12). Although the examples will be discussed in the context of a cloud computing environment, the examples are not limited to any particular type of computing environment. The computing devices 12 each have one or more processor devices 14 and a memory 16. A storage device 18 stores a plurality of applications 20-1-20-N (generally, applications 20, sometimes referred to herein as "services"). An application 20 comprises one or more files of programmable instructions and data that, when initiated on a computing device 12, provide some desired functionality, such as an online web store, a scientific calculator, an investment service, online banking services, or the like. Multiple applications 20 may collectively implement some desired functionality. For example, one application 20 may receive input from a user, send the input to a second application 20, which in turn obtains information from a third application 20. The second application 20 may perform certain processing and return data to the first application 20 for presentation to the user.

Each application 20-1-20-N may have a corresponding initial profile 22-1-22-N (generally, profiles 22) that identifies expected utilization values for the corresponding application 20 while executing on a computing device 12. As an example, the initial profile 22-1 that corresponds to the application 20-1 includes a utilization field that contains a memory utilization value 24-1 that identifies an expected maximum amount of memory that an instance of the application 20-1 will utilize when executing on a computing device 12. The initial profile 22-1 includes a utilization field that contains a processor utilization value 24-2 that identifies a processor utilization of an instance of the application 20-1 when executing on a computing device 12. The processor utilization may be quantified in any desired manner, such as the amount of processor time used by the instance over a predetermined period of time, a percentage of elapsed time that a processor spends executing the instance, a percentage of the processor used over a predetermined period of time relative to other applications executing on the processor device, or the like.

The initial profile 22-1 includes a utilization field that contains an input/output utilization value 24-3 that identifies a maximum expected number of inputs (reads) and outputs (writes) initiated by the instance over a one second period of time. The initial profile 22-1 includes a utilization field that contains an instance utilization value 24-4 that identifies the maximum number of instances of the application 20-1 that will be needed to handle the expected workload. It is appreciated that these are merely examples of the information that may be maintained in the initial profile 22-1, and that any suitable values or metrics useful for lifecycle management of the application 20-1 may be maintained in the initial profile 22-1.

The storage device 18 may also include a plurality of current profiles 26-1-26-N, each of which corresponds to an application 20-1-20-N, and which may contain the same utilization fields discussed above with regard to the initial profile 22-1, but have utilization values that are based on actual real-time resource utilization of an instance of the corresponding application 20, as will be discussed in greater detail herein. In some examples, the storage device 18 may store threshold information 28-1-28-N that corresponds to the applications 20-1-20-N, and that identifies thresholds for computing resource values that may identify what is desirable and what is undesirable.

Previous to a point in time illustrated in FIG. 1A, a service initiator 30 executing on the computing device 12-1 was requested to initiate an instance of the application 20-1, sometimes referred to herein as an application instance. As used herein, the term "instance" refers to an executing instantiation of an application 20. The request to initiate the application instance may be via an operator command, based on a schedule, in response to a programmatic request, or in response to some event. In this example, it will be assumed that the application 20-1 is a new application and has not been initiated previously, and thus, no current profile 26-1 has yet been generated and stored on the storage device 18.

The service initiator 30 accesses the storage device 18 and determines that no current profile 26-1 exists. The service initiator 30 then accesses the initial profile 22-1 and analyzes the utilization values 24-1-24-4. Based on the utilization values 24-1-24-4, the service initiator 30 identifies the computing device 12-1 as capable of providing the computing resources identified in the initial profile 22-1. In this example, the service initiator 30 determines that the computing device 12-1 has 1 GB of RAM available, can devote 30% of the processor device 14 of the computing device 12-1 to the application instance, and can process 20 I/Os per second. Based on the instance utilization value 24-4, the service initiator 30 initiates a single application instance 20-I1 on the computing device 12-1.

A service monitor 32 iteratively, periodically, intermittently, and/or in response to one or more events, determines a plurality of resource values 34-1-34-10 (generally, resource values 34) for the application instance 20-I1. The service monitor 32 determines a resource value 34-1 that quantifies a real-time amount of memory usage of the application instance 20-I1. The service monitor 32 determines a resource value 34-2 that quantifies a real-time average amount of memory usage of the application instance 20-I1 over a predetermined period of time.

The service monitor 32 determines a resource value 34-3 that quantifies an amount of processor device usage of the application instance 20-I1 over a predetermined period of time application. The service monitor 32 determines a resource value 34-4 that quantifies an instantaneous amount of processor device usage of the application instance 20-I1. The service monitor 32 determines a resource value 34-5 that quantifies a number of storage device reads that the application instance 20-I1 has initiated over a predetermined period of time, in this example, 1 second. The service monitor 32 determines a resource value 34-6 that quantifies a number of storage device writes that the application instance 20-I1 has initiated over a one-second period of time. The service monitor 32 determines a resource value 34-7 that quantifies a number of messages that are currently queued for the application instance 20-I1. The service monitor 32 determines a resource value 34-8 that quantifies a number of messages destined for the application instance 20-I1 that have been dropped. The service monitor 32 determines a resource value 34-9 that quantifies a current response time of the application instance 20-I1. The service monitor 32 determines a resource value 34-10 that quantifies an average response time of the application instance 20-I1 over a predetermined period of time.

The service monitor 32 determines the resource values 34-1-34-10 in any suitable manner. In some implementations, the service monitor 32 may send a request to an operating system of the computing device 12-1 to obtain the memory usage values, processor device usage values, and read and write initiation values of the application instance 20-I1. In this example, the application instance 20-I1 implements a message queue via a message queuing system 36, such as RabbitMQ, or the like. The service monitor 32 may send a request to the message queuing system 36 to obtain resource values such as the number of messages that are currently queued for the application instance 20-I1 and the number of messages destined for the application instance 20-I1 that have been dropped. The service monitor 32 may query a response time monitor 38 to determine a current response time and an average response time over a predetermined period of time.

The service monitor 32 generates a real-time current profile 26-1C based on the resource values 34-1-34-10. In particular, based on the resource values 34-1-34-10, the service monitor 32 generates a utilization value 27-1C that identifies the actual average memory utilization of the application instance 20-I1, a utilization value 27-2C that identifies the actual average processor device utilization of the application instance 20-I1, a utilization value 27-3C that identifies the actual reads and writes initiated by the application instance 20-I1, and a utilization value 27-4C that identifies the current number of instances of the application 20-1. In some implementations, the service monitor 32 may update the utilization values 27-1C-27-4C each time the service monitor 32 obtains the resource values 34-1-34-10. In other implementations, the service monitor 32 may obtain each of the real-time resource values 34-1-34-10 several times over multiple iterations over a period of time, such as one minute, five minutes, or the like, and process the resource values 34-1-34-10 to derive the utilization values 27-1C-27-4C. For example, the service monitor 32 may average the resource values 34-1-34-10 obtained over the period of time to derive the utilization values 27-1C-27-4C. The service monitor 32 may periodically or intermittently save the current values of the utilization values 27-1C-27-4C to the profile 26-1 on the storage device 18.

The profiles 26-1C, 26-1 may subsequently be used to facilitate the efficient use of computing resources. In some examples, the profiles 26-1C, 26-1 may be used to initiate additional instances of the application 20-1 using the utilization values in the profiles 26-1C, 26-1. In some examples, the profiles 26-1C, 26-1 may be used to migrate an instance of the application 20-1 from one computing device 12 to another computing device 12.

The service monitor 32 may access the threshold information 28-1 that corresponds to the application 20-1 and utilize the threshold information 28-1 for scaling purposes. In this example, the threshold information 28-1 includes a desired response time value 40 that identifies a desired response time to be in a range of 0-500 milliseconds (ms). The threshold information 28-1 also includes a desired message queue depth value 42 that identifies a desired message queue depth to be in a range of 0-9.

The service monitor 32 may compare the desired response time value 40 to the resource value 34-10 that quantifies the average response time of the application instance 20-I1 over a predetermined period of time. The service monitor 32 determines that the average response time of the application instance 20-I1 is substantially greater than the desired response time value 40 and determines that another instance of the application 20-1 should be initiated. The service monitor 32 sends a message to the service initiator 30 to initiate another instance of the application 20-1.

The service initiator 30 accesses the current profile 26-1C rather than the initial profile 22-1 to determine the computing resources currently utilized by the application instance 20-I1, and causes a new application instance 20-I2 to be initiated on the computing device 12-N utilizing the utilization values 27-1C, 27-2C, and 27-3C. Specifically, the service initiator 30 determines, based on the utilization values 27-1C, 27-2C, and 27-3C that the new instance should be initiated on a computing device 12 that has 0.4 GB of memory available, a processor core that can devote 75% utilization to the new instance, and that has a storage device that can handle 900 I/Os per second.

The service initiator 30 then obtains real-time execution environment statistics of the computing devices 12-1-12-N. The real-time execution environment statistics may include, for example, current processor utilization statistics of one or more processor cores of the computing devices 12-1-12-N, memory availability of the computing devices 12-1-12-N, storage device I/O capabilities, and the like.

Figure 1B:
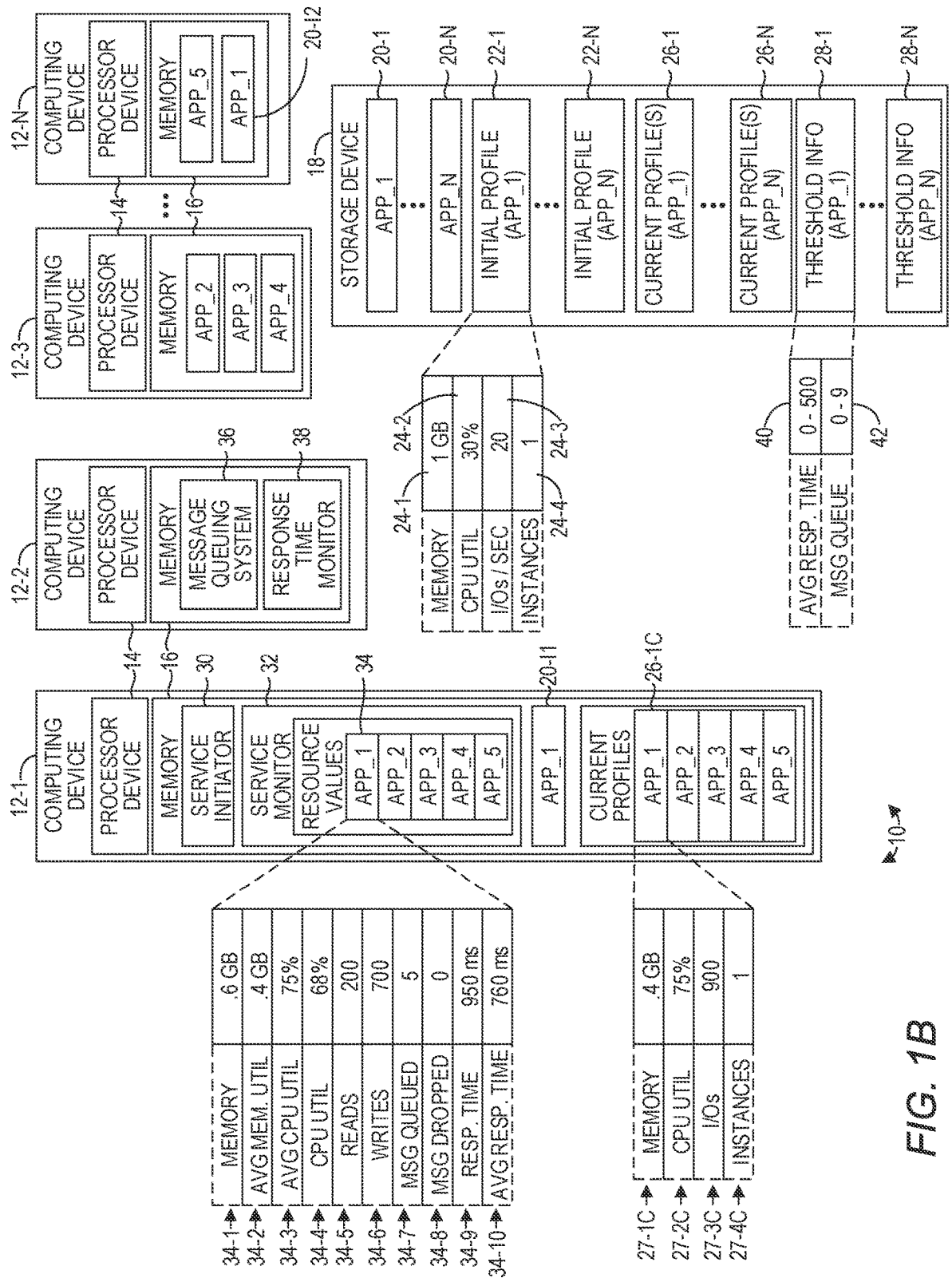

Referring now to FIG. 1B, the service initiator 30, based on the real-time execution environment statistics of the computing device 12-N, determines that the computing device 12-N has at least one processor core that is utilizing less than actual average processor device utilization identified in the utilization value 27-2C, that the memory 16 of the computing device 12-N has an amount of available memory larger than identified in the utilization value 27-1C, and is capable of processing a greater number of I/Os per second than identified in the utilization value 27-3C.

The service initiator 30 initiates a new application instance 20-I2 on the computing device 12-N. In some examples, the service initiator 30 may set, or cause the computing device 12-N to set a processor utilization limit or a memory limit for the application instance 20-I2 based on the current profile 26-1C. As an example, the service initiator 30 may set, or cause the computing device 12-N to set a Linux cgroups central processing unit (CPU) limit associated with the application instance 20-I2 to a particular value based on the utilization value 27-2C. The service initiator 30 may set or cause the computing device 12-N to set a Linux cgroups random access memory limit associated with the application instance 20-I2 to a particular value based on the utilization value 27-1C. The service initiator 30 may also update the utilization value 27-4C to indicate two instances of the application 20-1 are currently executing.

The service monitor 32 may now iteratively, periodically, intermittently, and/or in response to one or more events, determine the resource values 34-1-34-10 for each of the application instances 20-I1 and 20-I2. The service monitor 32 may process the resource values 34-1-34-10 from both of the application instances 20-I1 and 20-I2, such as, by way of non-limiting example, averaging the resource values 34-1-34-10 from both of the application instances 20-I1 and 20-I2, and then update the utilization values 27-1-27-4 based on such processing.

Assume that at a subsequent point in time the service monitor 32 determines that the resource values 34-10 that quantify the average response times of the application instances 20-I1, 20-I2 over a predetermined period of time has dropped to 200 ms and, thus, are within the desired response time of 0-500 ms identified in the desired response time value 40, and that the resource values 34-7 that quantify the number of messages that are currently queued for the application instances 20-I1, 20-I2 indicate a queue depth of 1 and, thus, are within the desired message queue depth identified by the desired message queue depth value 42. The service monitor 32 may then determine, based on the resource values 34-7 and 34-10, that one instance of the application 20-1 is sufficient to service the current load on the application instances 20-I1, 20-I2, and may then terminate the application instance 20-I2.

It is noted that because the service initiator 30 and the service monitor 32 are components of the computing device 12-1, functionality implemented by the service initiator 30 and/or the service monitor 32 may be attributed to the computing device 12-1. Moreover, in examples where the service initiator 30 and the service monitor 32 comprises software instructions that program the processor device 14 of the computing device 12-1 to carry out functionality discussed herein, functionality implemented by the service initiator 30 and the service monitor 32 may be attributed herein to the processor device 14.

It is further noted that, while the service initiator 30 and the service monitor 32 are shown as separate components, in other implementations, the service initiator 30 and the service monitor 32 could be implemented in a single component or could be implemented in a greater number of components than two. Finally, it is noted that while, for purposes of illustration and simplicity, the service initiator 30 and the service monitor 32 are illustrated as being implemented by the computing device 12-1, the service initiator 30 and the service monitor 32 may be distributed across the computing devices 12-1-12-N. Because the computing devices 12-1-12-N each include one or more processor devices, the service initiator 30 and the service monitor 32 may be implemented by a process device set that includes one or more processor devices 14 on one or more of the computing devices 12-1-12-N.

Figure 2:
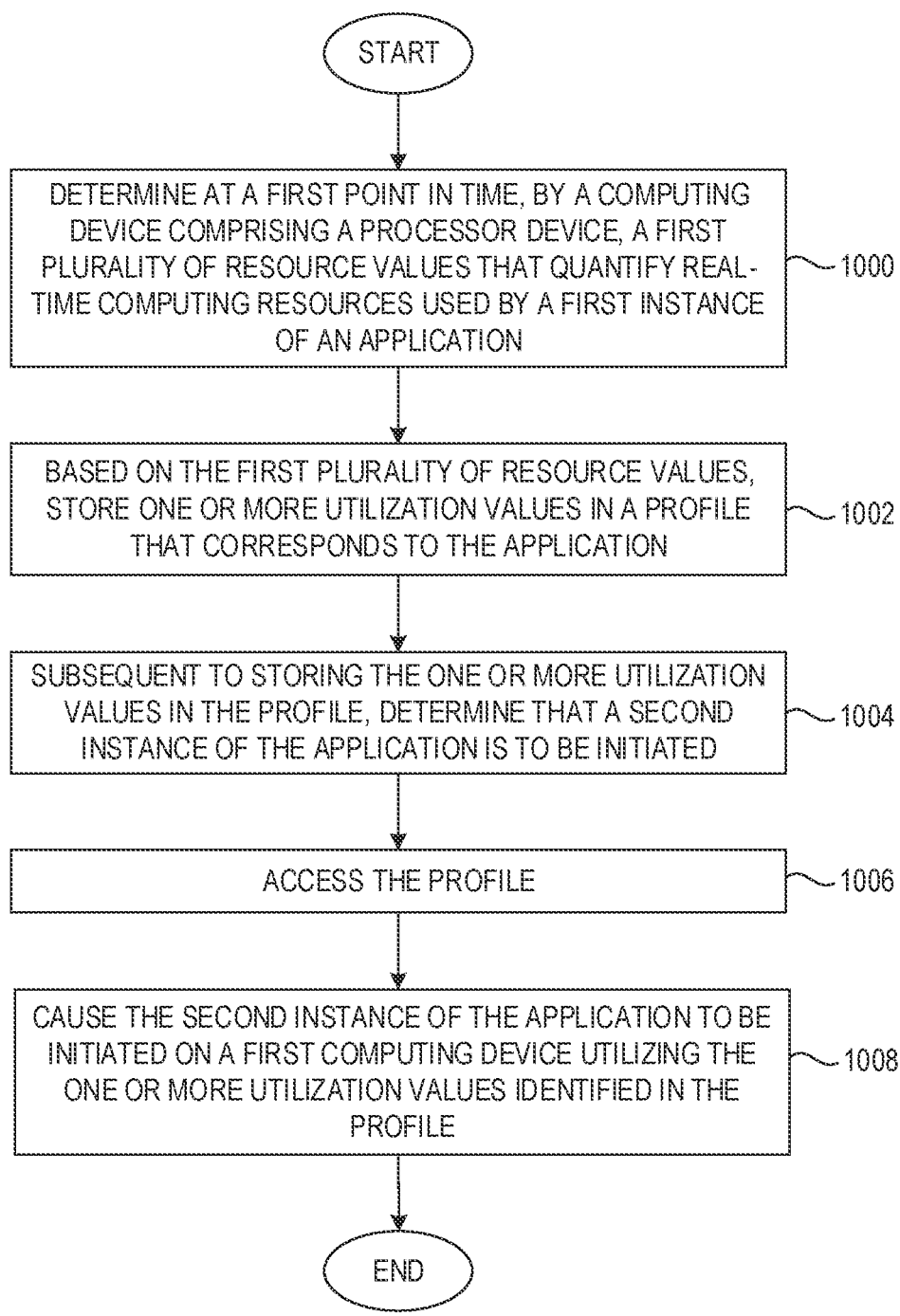
FIG. 2 is a flowchart of a method for application lifecycle management based on real-time resource usage according to one implementation.

FIG. 2 is a flowchart of a method for application lifecycle management based on real-time resource usage according to one implementation. FIG. 2 will be discussed in conjunction with FIGS. 1A-1B. The computing device 12-1 determines, at a first point in time, the plurality of resource values 34-1-34-10 that quantify the real-time computing resources used by the instance 20-I1 of the application 20-1 (FIG. 2, block 1000). Based on the plurality of resource values 34-1-34-10, the computing device 12-1 stores one or more utilization values 27-1C-27-4C in the current profile 26-1C that corresponds to the application 20-1 (FIG. 2, block 1002). Subsequent to storing the one or more utilization values 27-1C-27-4C in the current profile 26-1C, the computing device 12-1 determines that the second instance 20-I2 of the application 20-1 is to be initiated (FIG. 2, block 1004). The computing device 12-1 accesses the current profile 26-1C and causes the second instance 20-I2 of the application 20-1 to be initiated on the computing device 12-N utilizing the one or more utilization values 27-1C-27-4C identified in the current profile 26-1C (FIG. 2, blocks 1006, 1008).

Figure 3A:
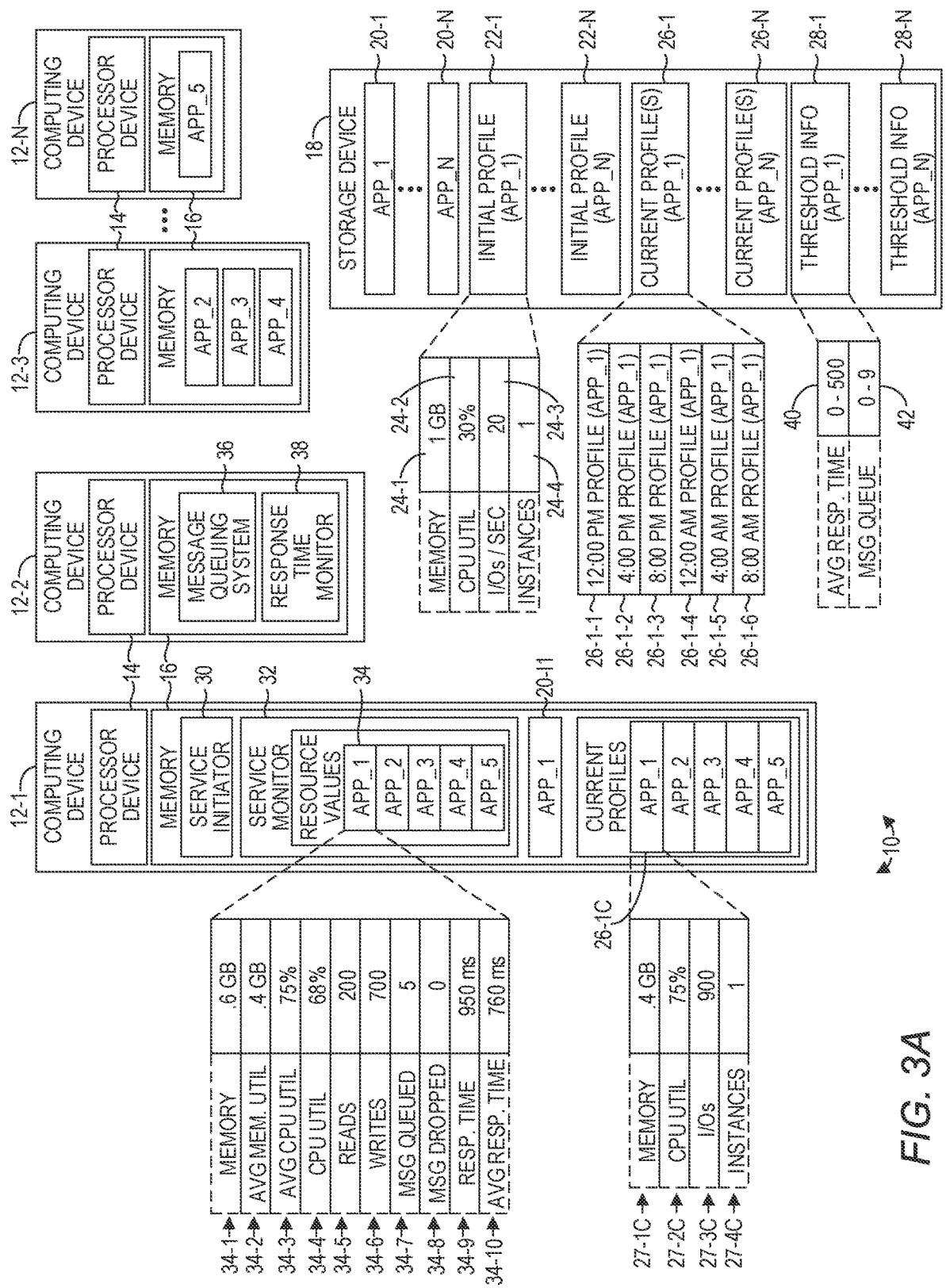
FIGS. 3A-3B are block diagrams of an environment at different points in time in which application lifecycle management based on real-time resource usage can be practiced according to another implementation.

FIG. 3A is a block diagram of the environment 10 according to another implementation. In this implementation, the service monitor 32 takes "snapshots" of the current profile 26-1C at various times of the day to generate a plurality of current profile copies 26-1-1-26-1-6, each associated with a particular time of day. In particular, the service monitor 32, at each respective time of day determines the plurality of resource values 34-1-34-10 that quantify real-time resources used by the application instance 20-I1. The service monitor 32, based on the plurality of resource values 34-1-34-10, updates one or more of the utilization values 27-1C-27-4C and stores the respective current profile copy 26-1-1-26-1-6 with information that identifies the respective time of day associated with storing the current profile copy 26-1-1-26-1-6.

The number of copies and times of day may be configurable or predetermined or may be based on a detected substantial difference in utilization values 27-1C-27-4C over time. In this example, the service monitor 32 generates six current profile copies 26-1-1-26-1-6. The profile copy 26-1-1 is generated at 12 PM, the profile copy 26-1-2 at 4 PM, the profile copy 26-1-3 at 8 PM, the profile copy 26-1-4 at 12 AM, the profile copy 26-1-5 at 4 AM, and the profile copy 26-1-6 at 8 AM. Each current profile copy 26-1-1-26-1-6 identifies the time of day that corresponds to the respective current profile copy 26-1-1-26-1-6. The information that identifies the time of day may comprise, for example, a portion of the file name of the current profile copy 26-1-1-26-1-6 or metadata associated with the current profile copy 26-1-1-26-1-6, or may be stored, for example, in a header record of the current profile copy 26-1-1-26-1-6. The utilization values 27-1C-27-4C in each of the current profile copies 26-1-1-26-1-6 may differ because the loads and usage of the application 20-1 may differ at different times of the day.

Figure 3B:
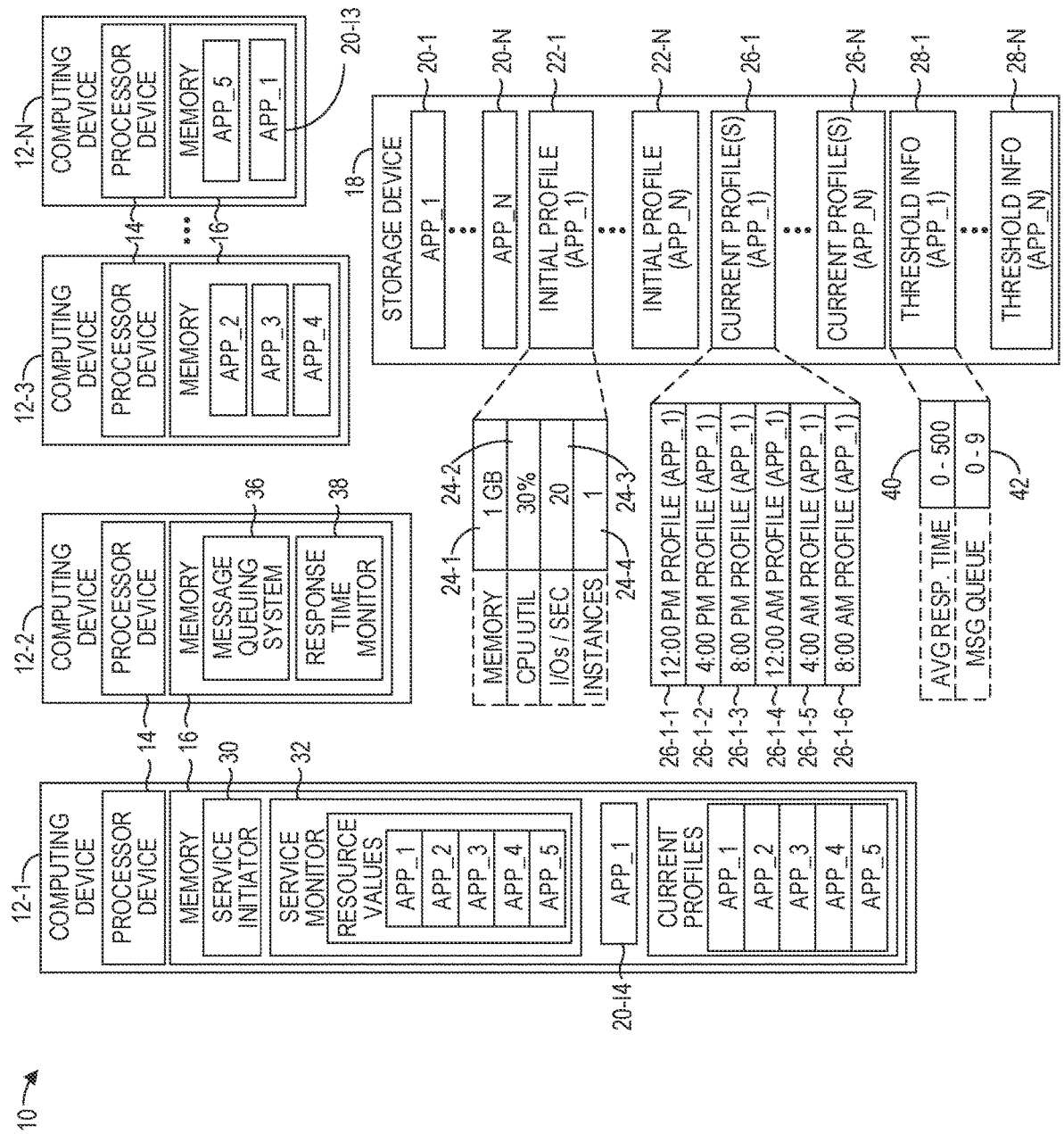

Referring now to FIG. 3B, assume that the application instance 20-I1 has been terminated. At 3 AM, the service initiator 30 is instructed to initiate an application instance of the application 20-1. The service initiator 30 accesses the storage device 18 and determines that the plurality of different current profile copies 26-1-1-26-1-6 exist on the storage device 18. The service initiator 30 accesses the current profile copies 26-1-1-26-1-6 and identifies the current profile copy 26-1-5 as the current profile associated with a time of day closest in time to the current time of 3 AM. The service initiator 30 accesses the profile copy 26-1-5 and, as discussed above with regard to FIG. 1B, obtains real-time execution environment statistics of the computing devices 12-1-12-N. The service initiator 30, based on the real-time execution environment statistics of the computing device 12-N, determines that the computing device 12-N has sufficient resources to execute a new instance of the application 20-1 based on the utilization values 27-1C-27-4C of the current profile copy 26-1-5. The service initiator 30 initiates a new application instance 20-13 on the computing device 12-N.

Subsequently, at 8:30 AM, the service initiator 30 is instructed to initiate another application instance of the application 20-1. The service initiator 30 accesses the storage device 18 and determines that the plurality of different current profile copies 26-1-1-26-1-6 exist on the storage device 18. The service initiator 30 accesses the current profile copies 26-1-1-26-1-6 and identifies the current profile copy 26-1-6 as the current profile associated with a time of day closest in time to the current time of 8:30 AM. The service initiator 30 accesses the profile copy 26-1-6 and, as discussed above with regard to FIG. 1B, obtains real-time execution environment statistics of the computing devices 12-1-12-N. The service initiator 30, based on the real-time execution environment statistics of the computing device 12-1, determines that the computing device 12-1 has sufficient resources to execute a new instance of the application 20-1 based on the utilization values 27-1C-27-4C of the current profile copy 26-1-6. The service initiator 30 initiates a new application instance 20-14 on the computing device 12-1.

Figure 4A:
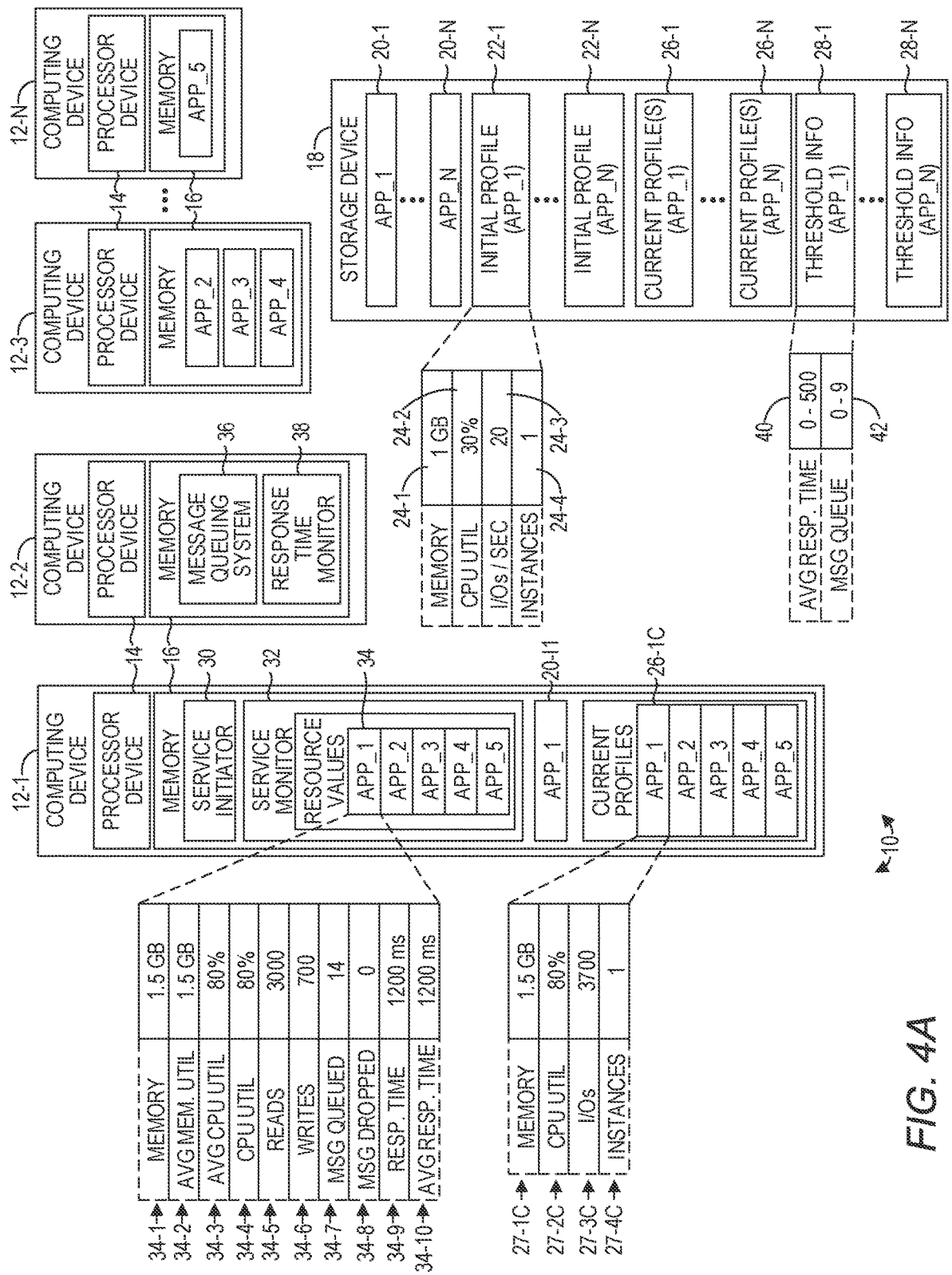
FIGS. 4A-4B are block diagrams of an environment at different points in time in which application lifecycle management based on real-time resource usage can be practiced according to yet another implementation.

FIG. 4A is a block diagram of the environment 10 according to another implementation. In this example, the application instance 20-I1 was initially initiated based on the initial profile 22-1, which contains the memory utilization value 24-1 that indicates that the application instance 20-I1 will utilize one GB of memory, the processor utilization value 24-2 that indicates the application instance 20-I1 will utilize 30 percent of a processor device, and the input/output utilization value 24-3 that indicates the application instance 20-I1 will initiate 20 I/Os per second. Based on these utilization values, the service initiator 30 initiated the application instance 20-I1 on the computing device 12-1.

At a point in time after the initiation of the application instance 20-I1, the utilization value 27-1C indicates that the application instance 20-I1 is actually utilizing 1.5 GB of memory, the utilization value 27-2C indicates that the application instance 20-I1 is actually utilizing 80% of the processor device 14, and the utilization value 27-3C indicates that the application instance 20-I1 is actually initiating 3700 I/Os per second. The resource value 34-9 indicates that the average response time of the application instance 20-I1 is 1200 ms, longer than that indicated by the desired response time value 40. The resource value 34-7 indicates that 14 messages are queued, a greater number than that indicated by the desired message queue depth value 42.

The service monitor 32 queries the operating system of the computing device 12-1 and determines that the storage device to which the application instance 20-I1 initiates reads and writes is a conventional electro-mechanical storage device that is under a heavy load and cannot consistently provide 3700 I/Os per second. The service monitor 32 further determines that the overall load on the processor device 14 of the computing device 12-1 is such that, in order to provide the necessary processor utilization to the application instance 20-I1, other application instances executing on the computing device 12-1 are being denied processor cycles. The service monitor 32 further determines that the application instance 20-I1 is using a substantial amount of the memory 16, causing memory paging and slowing down memory accesses of the application instance 20-I1 as well as other application instances executing on the computing device 12-1.

The service monitor 32 determines, based on the utilization values 27-1C-27-4C in the current profile 26-1C, that the computing device 12-1 has insufficient computing resources for the application instance 20-I1, and that the application instance 20-I1 should be migrated from the computing device 12-1 to another computing device 12 with sufficient resources based on the current profile 26-1C. The service initiator 30 obtains real-time execution environment statistics of the computing devices 12-2-12-N. The real-time execution environment statistics may include, for example, current processor utilization statistics of one or more processor cores of the computing devices 12-2-12-N, memory availability of the computing devices 12-2-12-N, storage device I/O capabilities, and the like.

Figure 4B:
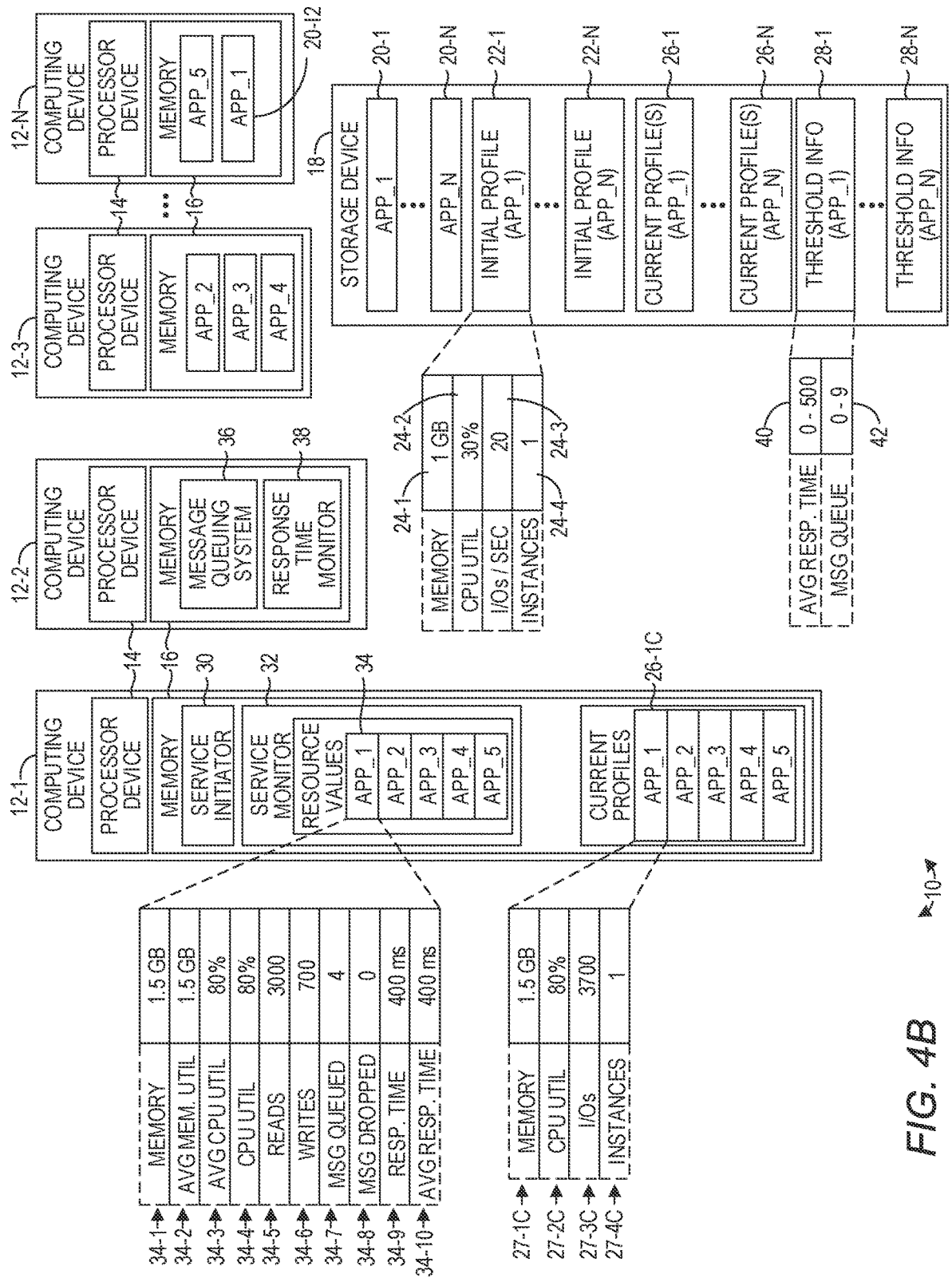

Referring now to FIG. 4B, the service initiator 30, based on the real-time execution environment statistics of the computing device 12-N, determines that the computing device 12-N has at least one processor core that is utilizing less than actual average processor device utilization identified in the utilization value 27-2C, that the memory 16 of the computing device 12-N has an amount of available memory larger than identified in the utilization value 27-1C, and has access to a solid state storage device capable of processing a greater number of I/Os per second than identified in the utilization value 27-3C.

The service initiator 30 initiates a new application instance 20-I2 on the computing device 12-N. After the application instance 20-I2 initiates, the service initiator 30 terminates the application instance 20-I1. The service monitor 32 subsequently obtains the resource values 34-1-34-10 for the application instance 20-I2 executing on the computing device 12-N. The resource value 34-9 indicates that the average response time of the application instance 20-I1 is now 400 ms, within the range of the desired response time value 40. The resource value 34-7 indicates that 4 messages are queued, a number within the range of the desired message queue depth value 42. Accordingly, the service initiator 30 determines that the migration of the application instance 20-I1 on the computing device 12-1 to the application instance 20-I2 on the computing device 12-N provided the application instance 20-I2 sufficient computing resources to provide the desired response time and maintain the desired message queue depth, and that no additional instances of the application 20-1 need be initiated.

Figure 5A:
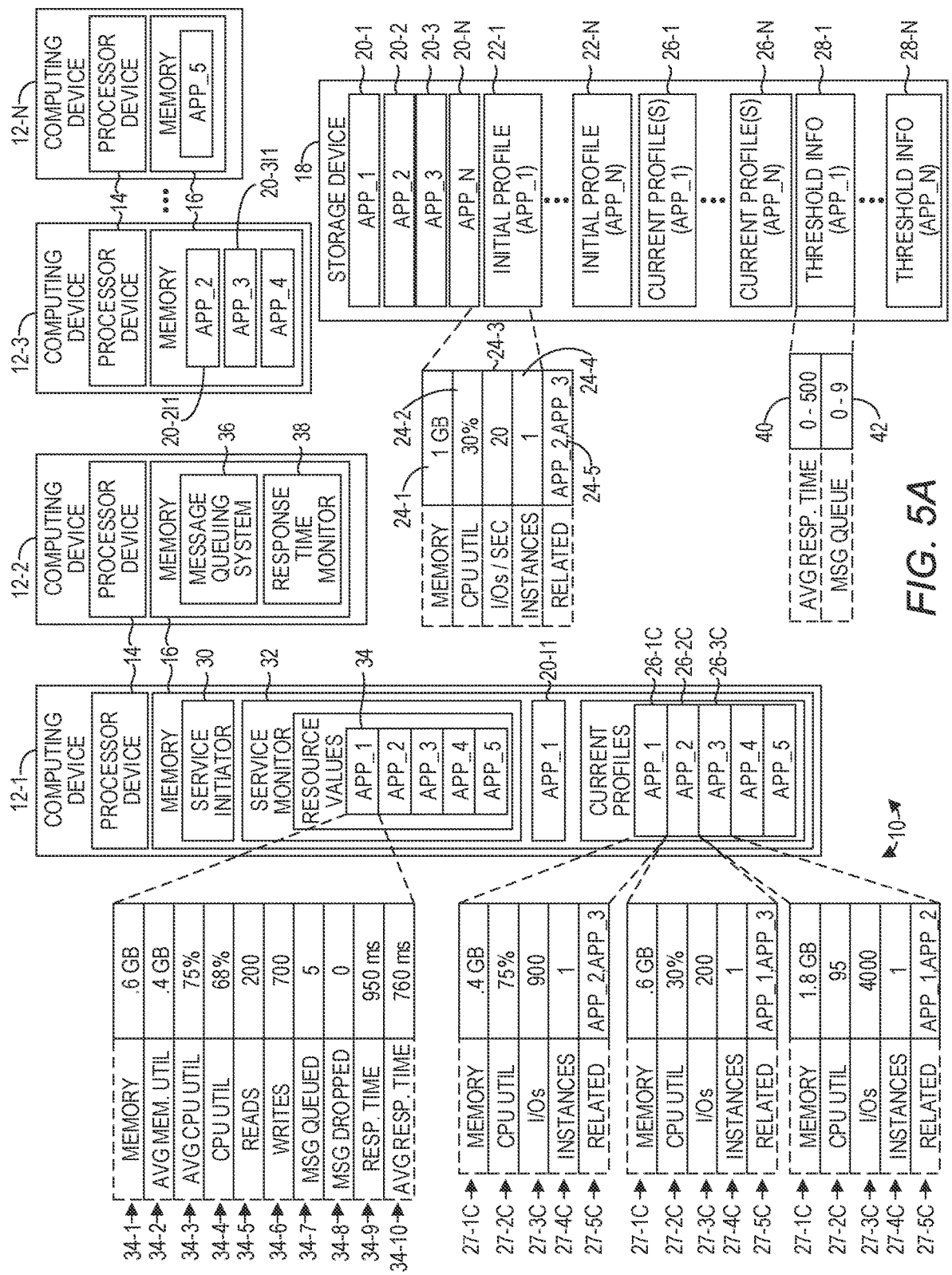
FIGS. 5A-5B are block diagrams of an environment at different points in time in which application lifecycle management based on real-time resource usage can be practiced according to yet another implementation.

FIG. 5A is a block diagram of the environment 10 according to another implementation. In this example a plurality of applications 20 may have dependencies with one another. For example, the output of a first application 20 may be the input to a second application 20. As another example, a first application 20 may provide data to a second application 20 for processing and may pause until receiving the processed output from the second application 20. In some examples, a set of applications 20 may operate in a series of processing steps and form a pipeline of applications 20.

In this example, the initial profiles 22 may identify the applications 20 that are dependent on one another. As an example, the initial profile 22-1 includes a related applications value 24-5 that identifies the applications 20-2 and 20-3 as being related to the application 20-1. At the instant in time illustrated in FIG. 5A, the current profile 26-1C of the application instance 20-I1 has a related application value 27-5C that identifies the applications 20-2 and 20-3 as being related; a current profile 26-2C of an application instance 20-2I1 of the application 20-2 has a related application value 27-5C that identifies the applications 20-1 and 20-3 as being related; and a current profile 26-3C of an application instance 20-3I1 of the application 20-3 has a related application value 27-5C that identifies the applications 20-1 and 20-2 as being related.

The service monitor 32 determines the plurality of resource values 34 for each of the application instances 20-I1, 20-2I1, and 20-3I1 and updates the utilization values in the current profiles 26-1C, 26-2C, and 26-3C based on such resource values 34. At the point in time illustrated in FIG. 5A, the service monitor 32 determines that the resource value 34-9 of the application instance 20-I1 indicates that the average response time is greater than the desired average response time identified in the desired response time value 40 of the threshold information 28-1. The service monitor 32 accesses the related application value 27-5C of the current profile 26-1C and determines that the applications 20-2 and 20-3 are related to the application 20-1. The service monitor 32 accesses the current profiles 26-2C and 26-3C. Based on the current profile 26-3C, the service monitor 32 determines that the application instance 20-3I1 is utilizing a large amount of the memory 16 of the computing device 12-3, a substantial portion of the capacity of the processor device 14 of the computing device 12-3, and initiating a large number of I/Os relative to the utilization values contained in the current profiles 26-1C and 26-2C.

The service monitor 32 queries the operating system of the computing device 12-2 and determines that the storage device to which the application instance 20-3I1 initiates reads and writes is a conventional electro-mechanical storage device that is under a heavy load and cannot consistently provide 4000 I/Os per second. The service monitor 32 further determines that the overall load on the processor device 14 of the computing device 12-3 is such that, in order to provide the necessary processor utilization to the application instance 20-3I1, other applications executing on the computing device 12-3, including the application instance 20-2I1 are being denied processor cycles. The service monitor 32 further determines that the application instance 20-3I1 is using a substantial amount of the memory 16 of the computing device 12-3, causing memory paging and slowing down memory accesses of the application instance 20-3I1 as well as the application instance 20-2I1.

The service monitor 32 determines, based on the current profile 26-3C, that the computing device 12-3 has insufficient computing resources for the application instance 20-3I1, and that the application instance 20-3I1 should be migrated from the computing device 12-3 to another computing device 12 with sufficient resources based on the current profile 26-3C. The service initiator 30 obtains real-time execution environment statistics of the computing devices 12-1, 12-2, and 12-N.

Figure 5B:
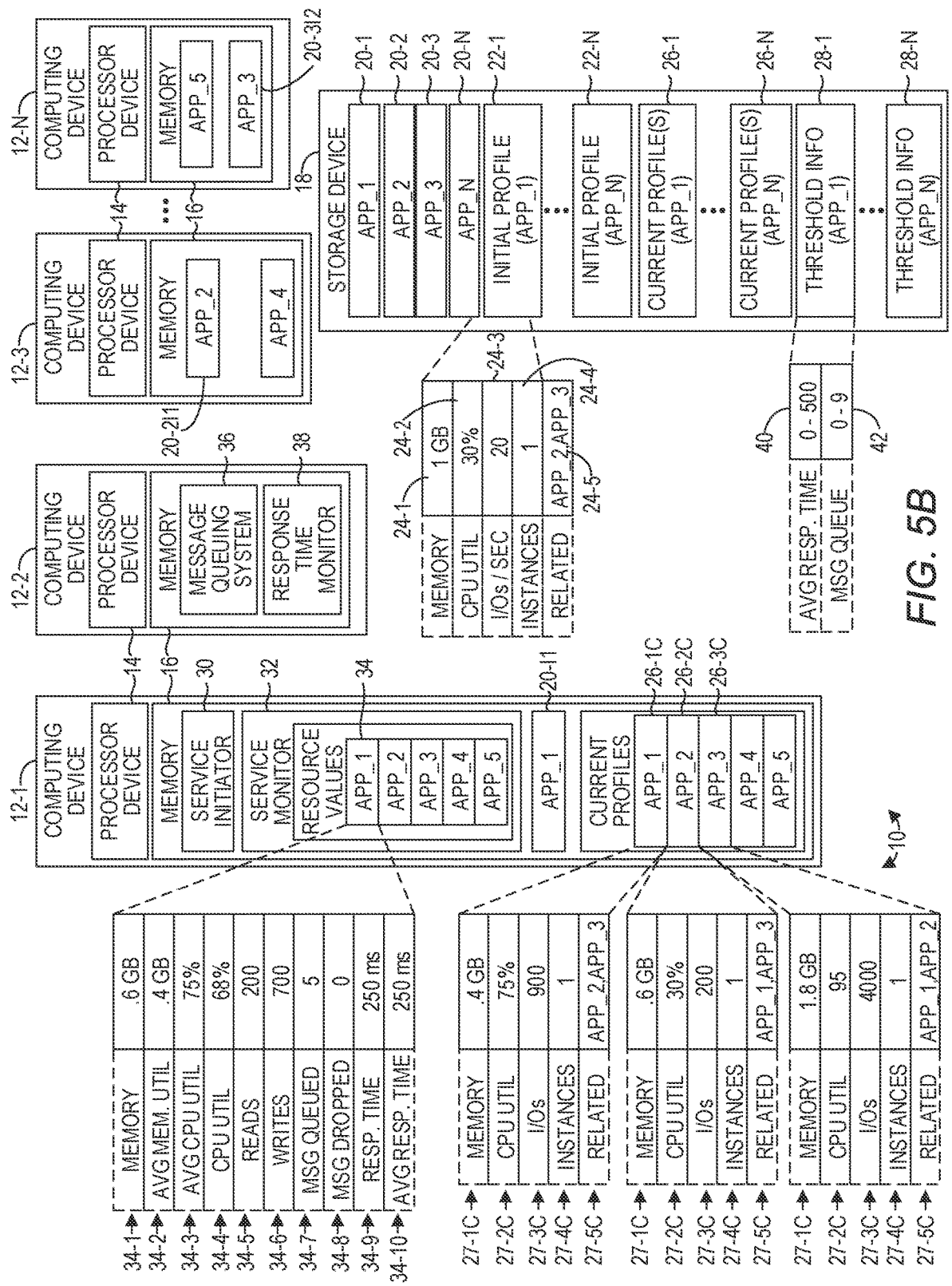

Referring now to FIG. 5B, the service initiator 30, based on the real-time execution environment statistics of the computing device 12-N, determines that the computing device 12-N has sufficient resources for an instance of the application 20-3, and has access to a solid-state storage device capable of processing a greater number of I/Os per second than identified in the current profile 26-3C.

The service initiator 30 initiates a new application instance 20-3I2 on the computing device 12-N. After the application instance 20-3I2 initiates, the service initiator 30 terminates the application instance 20-3I1 on the computing device 12-3. The service monitor 32 subsequently obtains the resource values 34-1-34-10 for the application instance 20-I1 executing on the computing device 12-1. The resource value 34-9 indicates that the average response time of the application instance 20-I1 is now 250 ms, within the range of the desired response time value 40. Accordingly, the service initiator 30 determines that the migration of the application instance 20-3I1 on the computing device 12-3 to the application instance 20-3I2 on the computing device 12-N provided the application instance 20-3I2 sufficient computing resources to implement processing at a sufficient rate to reduce the average response time to a desired response time.

Figure 6:
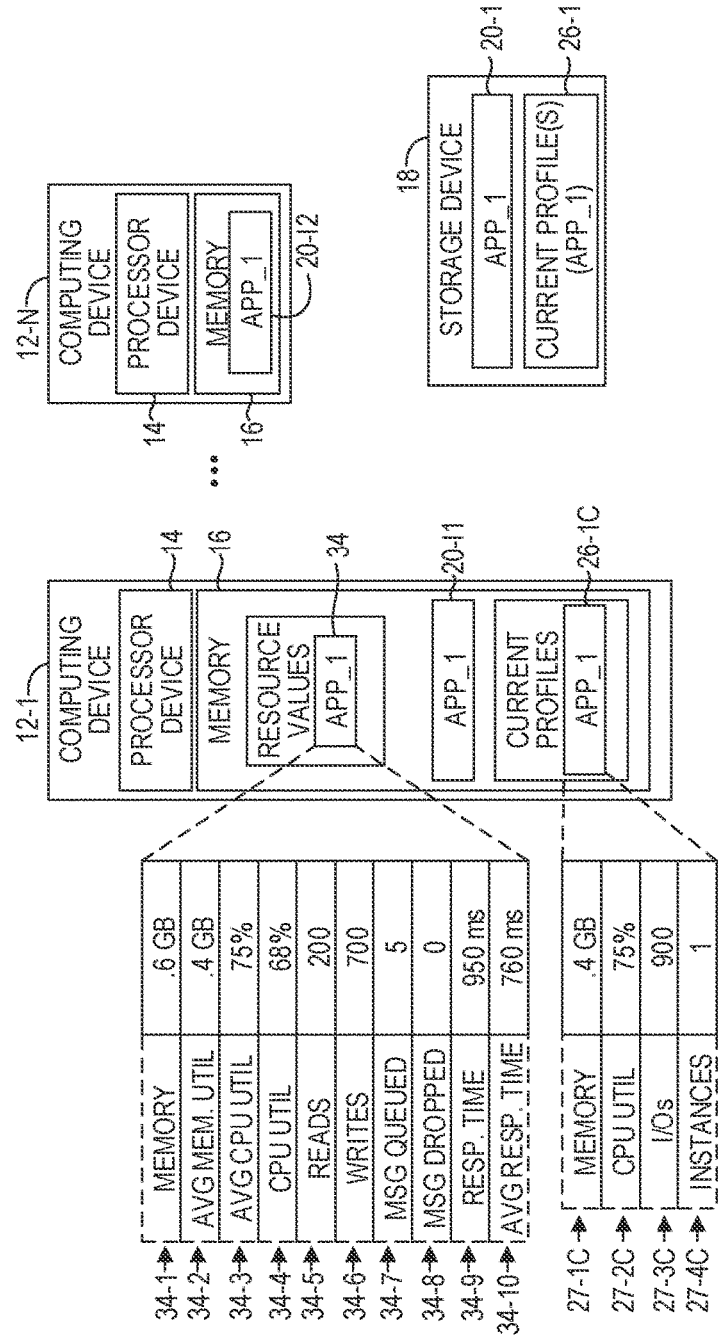
FIG. 6 is a simplified block diagram of the environment illustrated in FIGS. 1A-1B according to one implementation.

FIG. 6 is a simplified block diagram of FIGS. 1A and 1B according to one implementation. The environment 10 includes a computer system 44 that includes one or more processor devices 14 of the one or more computing devices 12-1-12-N. The one or more processor devices 14 are to determine at a first point in time the first plurality of resource values 34-1-34-10 that quantify real-time computing resources used by the first instance 20-I1 of the application 20-1. The one or more processor devices 14 are further to, based on the first plurality of resource values 34-1-34-10, store the one or more utilization values 27-1C-27-4C in the current profile 26-1C that corresponds to the application 20-1. The one or more processor devices 14 are further to, subsequent to storing the one or more utilization values 27-1C-27-4C in the current profile 26-1C, determine that the second instance 20-I2 of the application 20-1 is to be initiated. The one or more processor devices 14 are further to access the current profile 26-1C, cause the second instance 20-I2 of the application 20-1 to be initiated on the computing device 12-N utilizing the one or more utilization values 27-1C-27-4C identified in the current profile 26-1C.

Figure 7:
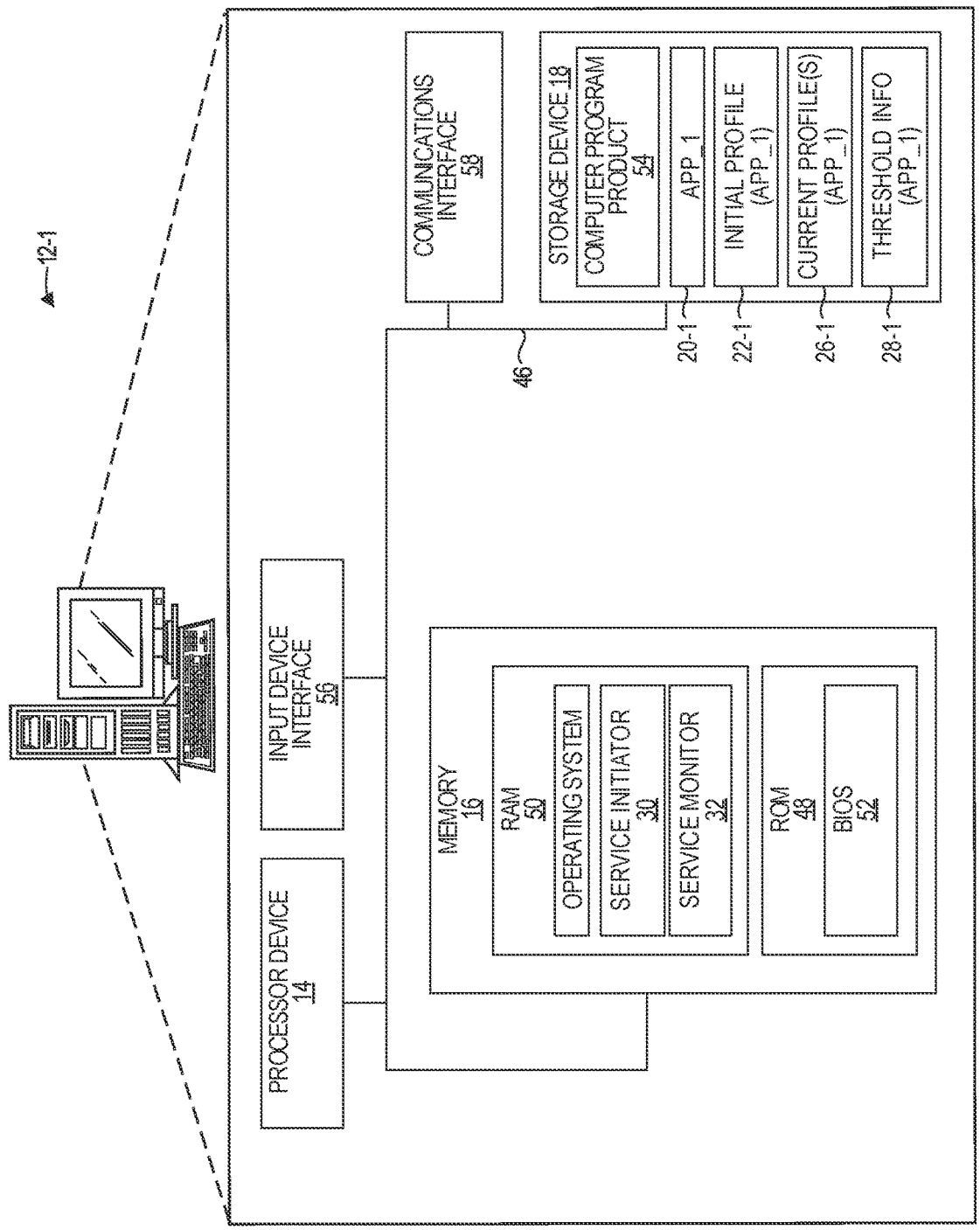
FIG. 7 is a block diagram of a computing device suitable for implementing examples.

FIG. 7 is a block diagram of the computing device 12-1 suitable for implementing examples according to one example, although, as discussed above, the examples disclosed herein may be distributed across any number of computing devices 12. The computing device 12-1 may comprise any computing or electronic device capable of including firmware, hardware, and/or executing software instructions to implement the functionality described herein, such as a computer server, a desktop computing device, a laptop computing device, or the like. The computing device 12-1 includes the processor device 14, the system memory 16, and a system bus 46. The system bus 46 provides an interface for system components including, but not limited to, the system memory 16 and the processor device 14. The processor device 14 can be any commercially available or proprietary processor.

The system bus 46 may be any of several types of bus structures that may further interconnect to a memory bus (with or without a memory controller), a peripheral bus, and/or a local bus using any of a variety of commercially available bus architectures. The system memory 16 may include non-volatile memory 48 (e.g., read-only memory (ROM), erasable programmable read-only memory (EPROM), electrically erasable programmable read-only memory (EEPROM), etc.), and volatile memory 50 (e.g., random-access memory (RAM)). A basic input/output system (BIOS) 52 may be stored in the non-volatile memory 48 and can include the basic routines that help to transfer information between elements within the computing device 12-1. The volatile memory 50 may also include a high-speed RAM, such as static RAM, for caching data.

The computing device 12-1 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like.

A number of modules can be stored in the storage device 18 and in the volatile memory 50, including an operating system and one or more program modules, such as the service initiator 30 and the service monitor 32, which may implement the functionality described herein in whole or in part. All or a portion of the examples may be implemented as a computer program product 54 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the service initiator 30 and the service monitor 32 in the volatile memory 50, may serve as a controller, or control system, for the computing device 12-1 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 56 that is coupled to the system bus 46 but can be connected by other interfaces such as a parallel port, an Institute of Electrical and Electronic Engineers (IEEE) 1394 serial port, a Universal Serial Bus (USB) port, an IR interface, and the like. The computing device 12-1 may also include a communications interface 58 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    determining at a first point in time, by a computing device comprising a processor device, a first plurality of resource values that quantify real-time computing resources used by a first instance of an application;
    based on the first plurality of resource values, storing one or more utilization values in a profile that corresponds to the application;
    subsequent to storing the one or more utilization values in the profile, determining that a second instance of the application is to be initiated;
    accessing the profile; and
    causing the second instance of the application to be initiated on a first computing device utilizing the one or more utilization values identified in the profile.

2. The method of claim 1 wherein causing the second instance of the application to be initiated utilizing the one or more utilization values identified in the profile comprises:
    obtaining real-time execution environment statistics of a plurality of different computing devices including the first computing device; and
    selecting the first computing device of the plurality of computing devices based on the one or more utilization values identified in the profile and the real-time execution environment statistics of the first computing device.

3. The method of claim 2 wherein the real-time execution environment statistics of the first computing device indicate that a current processor availability of the first computing device is greater than a processor utilization value identified in the profile.

4. The method of claim 1 further comprising:
    generating a plurality of copies of the profile at a plurality of different times of a day by, at each respective time of day of the plurality of different times of the day:
        determining a plurality of resource values that quantify real-time resources used by the first instance of the application;
        based on the plurality of resource values, updating one or more of the utilization values identified in the profile;
        storing a copy of the profile along with information that identifies the respective time of day associated with storing the copy.

5. The method of claim 4 further comprising:
    determining that a third instance of the application is to be initiated at a first time of day;
    accessing the plurality of copies of the profile;
    identifying a first copy of the plurality of copies of the profile based on the first time of day; and
    causing the third instance of the application to be initiated on a second computing device utilizing one or more of the utilization values identified in the first copy of the profile.

6. The method of claim 5 further comprising:
determining that a fourth instance of the application is to be initiated at a second time of day;
accessing the plurality of copies of the profile;
identifying a second copy of the plurality of copies of the profile based on the second time of day, the second copy of the profile identifying different utilization values than the utilization values identified in the first copy of the profile; and
causing the fourth instance of the application to be initiated on a third computing device utilizing the one or more utilization values identified in the second copy of the profile.

7. The method of claim 1 wherein the first plurality of resource values that quantify the real-time computing resources comprises one or more of a first processor utilization value that quantifies an amount of processor device utilization of the first instance of the application, a second processor utilization value that quantifies an amount of processor device utilization of the first instance of the application over a predetermined period of time, a memory utilization value that quantifies an amount of memory utilization of the first instance of the application, a read value that quantifies a number of storage device reads that the first instance of the application has initiated over a predetermined period of time, a write value that quantifies a number of storage device writes that the first instance of the application has initiated over a predetermined period of time, a messages queued value that identifies a number of messages that are queued for the first instance of the application, and a messages dropped value that quantifies a number of messages destined for the first instance of the application that have been dropped.

8. The method of claim 1 wherein determining the plurality of resource values further comprises sending a request to an operating system to obtain one or more of the plurality of resource values.

9. The method of claim 1 wherein determining the first plurality of resource values further comprises sending a request to a message queuing system to obtain one or more of the first plurality of resource values.

10. The method of claim 1 further comprising:
determining at a second point in time a second plurality of resource values that quantify real-time computing resources used by the second instance of the application;
based on the second plurality of resource values, determining that a third instance of the application should be initiated;
initiating the third instance of the application; and
updating the one or more utilization values to indicate that an additional instance of the application has been initiated.

11. The method of claim 10 further comprising:
subsequent to initiating the third instance of the application, determining at a third point in time a third plurality of resource values that quantify real-time computing resources used by the third instance of the application;
based on the third plurality of resource values, determining that the third instance of the application can be terminated;
terminating the third instance of the application; and
updating the one or more utilization values to indicate a current number of instances of the application that are executing.

12. The method of claim 1 further comprising:
determining at a second point in time a second plurality of resource values that quantify real-time computing resources used by the second instance of the application;
based on the second plurality of resource values, determining that the second instance of the application should be migrated to a second computing device;
initiating a third instance of the application on the second computing device; and
terminating the second instance of the application.

13. The method of claim 1 further comprising:
accessing information that identifies a plurality of dependent applications including the application, each dependent application in the plurality of dependent applications having at least one dependency with another dependent application in the plurality of dependent applications;
determining, for each respective dependent application in the plurality of dependent applications, a plurality of resource values that quantify real-time resources used by an instance of the respective dependent application;
storing, for each respective dependent application in the plurality of dependent applications, one or more utilization values in a profile that corresponds to the instance of the respective dependent application;
determining that a resource value associated with an instance of a dependent application is outside of a desired range; and
in response to determining that the resource value is outside of the desired range, migrating the instance of the dependent application from one computing device to another computing device.

14. The method of claim 1 wherein causing the second instance of the application to be initiated on the first computing device utilizing the one or more of the utilization values identified in the profile further comprises one of setting a cgroups central processing unit (CPU) limit associated with the second instance of the application to a particular value and setting a cgroups random access memory limit associated with the second instance of the application to a particular value.

15. The method of claim 1 wherein causing the second instance of the application to be initiated on the first computing device utilizing the one or more of the utilization values identified in the profile comprises:
determining that the first computing device utilizes a particular type of storage drive; and
based on determining that the first computing device utilizes the particular type of storage drive, causing the second instance of the application to be initiated on the first computing device.

16. A computer system comprising:
one or more processor devices of one or more computing devices, the one or more processor devices to:
determine at a first point in time a first plurality of resource values that quantify real-time computing resources used by a first instance of an application;
based on the first plurality of resource values, store one or more utilization values in a profile that corresponds to the application;
subsequent to storing the one or more utilization values in the profile, determine that a second instance of the application is to be initiated;
access the profile; and
cause the second instance of the application to be initiated on a first computing device utilizing the one or more utilization values identified in the profile.

17. The computer system of claim 16 wherein to cause the second instance of the application to be initiated utilizing the one or more utilization values identified in the profile, the one or more processor devices are further to:
  obtain real-time execution environment statistics of a plurality of different computing devices including the first computing device; and
  select the first computing device of the plurality of computing devices based on the one or more utilization values identified in the profile and the real-time execution environment statistics of the first computing device.

18. The computer system of claim 16 wherein the one or more processor devices are further to:
  generate a plurality of copies of the profile at a plurality of different times of a day by, at each respective time of day of the plurality of different times of the day:
    determine a plurality of resource values that quantify real-time resources used by the first instance of the application;
    based on the plurality of resource values, update one or more of the utilization values identified in the profile;
    store a copy of the profile along with information that identifies the respective time of day associated with storing the copy.

19. A non-transitory computer-readable storage medium that includes executable instructions configured to cause one or more processor devices to:
  determine at a first point in time a first plurality of resource values that quantify real-time computing resources used by a first instance of an application;
  based on the first plurality of resource values, store one or more utilization values in a profile that corresponds to the application;
  subsequent to storing the one or more utilization values in the profile, determine that a second instance of the application is to be initiated;
  access the profile; and
  cause the second instance of the application to be initiated on a first computing device utilizing the one or more utilization values identified in the profile.

20. The non-transitory computer-readable storage medium of claim 19 wherein the instructions further cause the one or more processor devices to:
  generate a plurality of copies of the profile at a plurality of different times of a day by, at each respective time of day of the plurality of different times of the day:
    determine a plurality of resource values that quantify real-time resources used by the first instance of the application;
    based on the plurality of resource values, update one or more of the utilization values identified in the profile;
    store a copy of the profile along with information that identifies the respective time of day associated with storing the copy.

* * * * *